(12) United States Patent
Epstein (10) Patent No.: US 8,505,937 B2
(45) Date of Patent: Aug. 13, 2013

(54) SKATING DEVICE

(76) Inventor: Andreas Epstein, München (DE)

( * ) Notice: Subject to any disclaimer, the term of this patent is extended or adjusted under 35 U.S.C. 154(b) by 209 days.

(21) Appl. No.: 12/991,029

(22) PCT Filed: May 5, 2009

(86) PCT No.: PCT/EP2009/003212
§ 371 (c)(1),
(2), (4) Date: Feb. 3, 2011

(87) PCT Pub. No.: WO2009/135647
PCT Pub. Date: Nov. 12, 2009

(65) Prior Publication Data
US 2011/0127734 A1    Jun. 2, 2011

(30) Foreign Application Priority Data
May 6, 2008 (DE) .......................... 10 2008 022 195

(51) Int. Cl.
*B62M 1/00* (2010.01)
(52) U.S. Cl.
USPC .................................. 280/87.041; 280/87.01
(58) Field of Classification Search
USPC ............ 280/12.1, 12.12, 12.13, 12.14, 87.01, 280/87.021, 87.041, 87.043
See application file for complete search history.

(56) References Cited

U.S. PATENT DOCUMENTS

| | | | |
|---|---|---|---|
| 4,540,192 A | 9/1985 | Shelton | 280/282 |
| 6,220,612 B1 | 4/2001 | Beleski, Jr. | 280/87.041 |
| 6,976,687 B2 * | 12/2005 | Beleski, Jr. | 280/87.041 |
| 7,837,209 B2 * | 11/2010 | Spencer et al. | 280/87.042 |
| 2001/0033069 A1 * | 10/2001 | Ivers | 280/648 |
| 2007/0096410 A1 | 5/2007 | Spencer | 280/14.21 |

FOREIGN PATENT DOCUMENTS

| | | |
|---|---|---|
| DE | 19757358 | 12/1997 |
| WO | WO2006135196 | 12/2006 |

OTHER PUBLICATIONS

"Notification of Transmittal of the International Search Report and The Written Opinion of the International Searching Authority, or the Declaration" for PCT/EP2009/003212 filed May 5, 2009; 11 pages.

* cited by examiner

*Primary Examiner* — John Walters
(74) *Attorney, Agent, or Firm* — Westman, Champlin & Kelly, P.A.

(57) ABSTRACT

The present invention relates to a skating device which comprises two footboard assemblies with ground contact rollers or skids; two rods, wherein each rod comprises a distal end and a proximal end. The distal ends of the rods are mounted to the footboard assemblies, respectively, and the proximal ends of the rods are mountable to a common support means located above the footboard assemblies. Each footboard assembly is allowed to move at least in two degrees of freedom with respect to the support means such that a skating movement of the two footboard assemblies with respect to the support means is possible.

15 Claims, 4 Drawing Sheets

SKATING DEVICE

CROSS-REFERENCE TO RELATED APPLICATION

This Application is a Section 371 National Stage Application of International Application No. PCT/EP2009/003212, filed May 5, 2009 and published as WO2009/135647 on Nov. 12, 2009, in English, the contents of which are hereby incorporated by reference in their entirety.

The present invention generally relates to an exercise apparatus, and more particularly to a skating device which in use is adapted to support a user's skating or roller blading movement. In particular, the present invention relates to a progressive movement device which provides a high degree of resistance to tipping during skating or roller blading movement.

BACKGROUND OF THE INVENTION

In recent years the popularity of the cambering vehicles and mechanisms with wheels for sport and recreation has increased. Such wheeled vehicles, which are propelled forwardly by the body movement of the occupant, have already been proposed in several patent applications. For instance, U.S. Pat. No. 4,540,192 discloses a three-wheeled scooter—type vehicle, comprising a front supporting hand-controlled steering wheel, a pair of rearwardly extending foot support frames pivotally connected with the front steering column, each of said foot support frames being carried on a caster wheel with ball bearings for independent sidewise swinging movement, i.e., each foot support is allowed to pivot around the steering column sideways. Such a swinging movement is, however, an abnormal motion for a user such that movement with the scooter-type vehicle is exhausting.

U.S. Pat. No. 6,220,612 discloses a cambering vehicle with a single steerable front wheel and a pair of rear wheels at the rearward ends of trailing arms extending from the front structure. The two trailing arms are articulated to the front structure, and may move arcuately in a plane parallel to the front wheel column of the vehicle. The two trailing arms are linked together by a yoke mechanism and move in opposite directions but in equal arcuate distances relative to one another. Thus, for propelling the vehicle the user inclines his/her body alternatively from one side to the other, thus transferring his/her weight from one side of the vehicle to the other. This kind of movement results in an almost "sinusoidal" path of the vehicle.

U.S. 2007/0096410 relates to ski devices, specifically to a tri platform control device, which allows a person to stand on while skiing. The design of this tri-platform is similar to the design of the above-mentioned U.S. Pat. No. 6,220,612 device. In particular, the device uses a universal joint to attach two lateral platforms to a vertical platform. The tri platform is designed to allow the lateral platforms to stay parallel to one another while skiing the edge. Moreover, U.S. 2007/0096410 also discloses an embodiment with adjustable lateral platforms, which allows the rider to adjust the width of the lateral platforms before riding, i.e., the distance between the two permanently parallely aligned platforms is adjustable.

The German Patent DE 197 57 358 relates to a training device for simulating cross-country skiing on rollers (classical style). The device comprises two tread means, which are connected with ground-contacting rollers and are mounted for longitudinal sliding motion (forward and rearward). A steering means is coupled with the tread means. The steering means is further connected at the bottom to at least one wheel. In order to support the forward/rearward motion of the tread means, at least one roller of each tread means can rotate in one direction only.

The natural skating motion with roller skates or inline-skates is nowadays very popular since a very efficient and rapid locomotion is possible. However, learning skating depends highly on the person's individual ability; usually it takes a talented beginner about six weeks to learn to skate.

It is therefore an object of the invention to provide a robust apparatus which is adapted to support a user's feet in movement during a natural skating motion. A further object of the invention is to provide a simplified device which may be easily and economically manufactured, and which allows a user to perform a leg motion which approximates the motion performed by roller blading or ice skating.

This and other objects are achieved by the features of the independent claim. Further preferred embodiments are characterized in the dependent claims.

SUMMARY OF THE INVENTION

The present invention provides a simply designed and readily operatable vehicle or piece of fitness equipment which comprises a compact structure and renders possible a dynamic skating or blading movement. In particular, the present invention provides a skating device used to assist and support a user during a natural skating or roller-blading movement, whereby each of user's legs is allowed to travel/move simultaneously in a lateral and forward/rearward (lengthwise) direction. In other words, the present invention provides a device which supports a user in a natural skating movement, whereas "knocking knees" are avoided. The device of the present invention preferably allows such a support by the device itself, i.e., it is preferred that a user does not have to wear special equipment, e.g., special shoes.

The device of the present invention is a "skating device" which may be used as a fitness equipment but also as a mobility device, e.g., instead of a bicycle. According to a preferred embodiment of the present invention, the skating device of the present invention is collapsible and/or foldable such that transportation of the device is very convenient when the device is not in use. It is further preferred that the collapsed device is easy to carry when not in use. Moreover, it is preferred that the device may be used without further equipment, e.g., it is preferred that a user may wear his/her "standard shoes" (no extra shoes are necessary).

The device according to the present invention preferably comprises at least a pair of footboard assemblies (pedals or footpads) adapted to support the feet of a user standing thereon during use, i.e., during skating movement. According to a preferred embodiment of the invention, each footboard assembly may be constructed similar to a (roller) skate, which comprise a "step-on board" (means for supporting the user's foot) and at least one sliding element at the lower side, e.g., wheels, a skid or a ski. The footboard assemblies according to the present invention are preferably not limited to a particular design. In other words, the footboard assemblies are preferably constructed to support the user's feet while wearing his/her standard shoes. Since the tilt of the user's legs ("knocking knees") is avoided by mounting the footboard assemblies by means of arm assemblies to a (common) support means, additional support means which have to be fixed to the lower leg are not necessary.

In particular, the footboard assemblies according to the present invention may be constructed like typical roller skates with shoes or rims for securing the user's feet. According to a preferred embodiment each footboard assembly comprises a securing means with at least one rim to secure the user's standard shoes on the footboard assembly.

According to a preferred embodiment, the footboard assemblies are designed like "in-line" skates, which have a plurality of small-diameter wheels aligned in a longitudinal direction beneath the sole of the skater's foot. Also alternative skate designs, e.g., skates with large-diameter wheels are possible. For instance, designs which place the wheel to the outside of the skater's foot are also possible, i.e., the wheels or rollers are located beside the user's foot or in front and behind the user foot and not beneath like in typical in-line skates. Such a design allows for example a lower center of gravity, i.e., the distance between the ground and the user foot may be reduced, but a minimum diameter of the wheel may be maintained which provides higher driving comfort. Moreover, the longitudinal length of a footboard assembly according to the present invention is further not limited. For instance, a footboard assembly with rollers according to the present invention may be designed as roller ski, which is a non-snow equivalent to cross-country ski. It is further preferred that a user may wear his/her own shoes, e.g. athletic shoes or business shoes, wherein the shoes are firmly positioned on the footboard assembly by means of a binding, e.g., an attachment which anchors the foot and/or boot to the footboard assembly. The present invention is not limited to any binding system, however, for the user's convenience it is preferred that the foot is attached to the footboard assembly by as less as possible fasteners. For instance, the binding may be a cable binding. Moreover, a binding may comprise straps, e.g. Velcro fasteners, which enables fast and easy put on and take off. Thus, there is no longer the problem of having to put on and/or take off special boots for skating. Accordingly, the term "footboard assembly" as used in the present application is not limited to a "board" but refers to any means which supports the user's foot and is preferably further adapted to support rollers, wheels or skid or ski.

As mentioned above, according to the present invention a plurality of designs of the footboard assembly itself are possible. The gist of the invention is preferably the way the footboard assemblies are mounted to a support means. In particular, according to the present invention, the footboard assemblies are mounted to a common support means via arms assemblies such that a user is supported in the natural skating movement/motion but the user's tipping probability is reduced, since the user can grip the support means or a handlebar which is mounted to the support means. In other words, with the present invention customary balance problems are avoided.

According to a preferred embodiment, the footboard assemblies are mounted by means of arm assemblies or arms to the support means, wherein the support means is located above the footboard assemblies during use of the device. An arm or arm assembly may comprise leverage with a plurality of rods or may comprise a single rod. According to a preferred embodiment, the arms are constructed such that each footboard assembly may be individually moved with respect to the support means. It is further preferred that the skating device according to the present invention comprises a handlebar which helps a user in keeping his/her balance. According to a preferred embodiment, the handlebar is part of the support means such that the arms are mounted to the handlebar. However, according to another preferred embodiment of the present invention, the support means and the handlebar may be separate parts, e.g., the support means may be located below the handlebar. For instance, the handlebar may be mounted to the upper end of a steering column, whereas the arm assemblies are mounted to the support means which is fixed to the steering column or a part of the steering column below the handlebar.

Thus, the combination of a common support means and especially the handlebar with the arm assemblies and the footboard assemblies provides the advantage that a user's feet and arms are supported by a single skating device. In other words, the design of a single skating device provides the advantage that the user's legs and arms are supported by a single device which enhances the balance of the user. According to a further preferred embodiment, the skating device according to the present invention comprises at least one brake such that the skating device also assists a user to control his/her moving speed.

The directions "above", "lateral", etc. as used in the present application are preferably used in relation to the device during use. For example, the support means (e.g. the handlebar) is located above the footboard assemblies (which are in ground contact via rollers or skids) during use.

Moreover, in the present application the term "degrees of freedom" (DOF) refers to a set of independent displacements and/or rotations that specify the displaced position and orientation of a body or system. This concept of DOF is typically used when systems of moving bodies in mechanical engineering, robotics, structural engineering, etc. are specified. For instance, a particle that moves in three-dimensional space has three translational displacement components as DOFs, while a rigid body would have at most six DOFs including three rotations. Translation is the ability to move without rotating, while rotation is angular motion about some axis. In three dimensions, the six DOFs of a rigid body are sometimes described using nautical names: moving up and down (heaving); moving left and right (swaying); moving forward and backward (surging); tilting forward and backward (pitching); turning left and right (yawing); and tilting side to side (rolling). The degrees of freedom are often defined with respect to the space in which we live. However, in the following, the degrees of freedom will be preferably (but not exclusively) defined with respect to the skating device and/or a defined point of the skating device, e.g., the support means.

Thus, using the above defined terminology, the prior art device as described in the German Patent DE 197 57 358 merely allows "surging" of the footboard with respect to the steering column, i.e., a forward and backward movement of the footboards. On the other hand, the prior art device of U.S. Pat. No. 4,540,192 merely allows "yawing" of the footboards with respect to the steering column, i.e., turning left and right with respect to the steering column. U.S. Pat. No. 6,220,612 merely allows "pitching" of the trailer arms, i.e., tilting forward and backward with respect to the steering column.

In order to allow a supported natural skating motion as done by the device according to the present invention, it is preferred to allow at least "swaying" and "surging" with respect to the support means (steering means), i.e., each user's leg should be allowed to move simultaneously in a lateral (sideways) and forward/rearward motion. Consequently, the device according to the present invention connects the two footboard assemblies with the support means such that each arm is (preferably individually) allowed to move at least in two degrees of freedom with respect to the support means. Preferably these two degrees of freedom are "surging" and "swaying".

In other words, in order to allow a skating motion, it is preferred that each of the two footboard assemblies may move in a forward/rearward direction (longitudinal movement; parallel to the direction of motion) and simultaneously in an outward/inward direction (lateral movement; substantially orthogonal to the direction of motion) with respect to the support means. Still in other words, it is preferred that each footboard assembly is preferably continuously movable in a longitudinal and lateral direction within an area "A", which is preferably located beside (or adjacent to) and behind the support means. According to a further preferred embodiment, it is additionally preferred that each footboard assembly is preferably continuously movable in a longitudinal and a lateral direction within an area "B", which is preferably located beside or adjacent to the support means and additionally beside and before (ahead) the support means. In order to allow a smooth skating movement it is therefore preferred that each footboard assembly is allowed to move within the area A or A+B such that each point within these areas is reachable with the footboard assembly. Furthermore it is preferred that the area A and/or A+B of the left foot and the area A and/or A+B of the right foot overlap partly. In other words it may be preferred that the left foot is allowed to move partly within the area A and/or A+B of the right foot and vice versa.

According to a preferred embodiment, the arms are mounted via bearings or joints to the support means, wherein the bearings preferably allow a pivot movement. Thus, in order to allow a forward-backward and sideway movement, it is preferred that the two degrees of freedom are "pitching" and "yawing", i.e., a rotational movement back and forth and a rotational movement sideways.

For instance, a device according to the present invention may comprise a steering column with at least one ground contact wheel at one end (lower end) and a handlebar/support means at the other end (upper end). Arms (or rods) with a fixed length may be used for mounting the footboard assemblies to the handlebar. In order to allow a forward-backward movement of the footboard assemblies with respect to the steering column, each arm may be mounted via a bearing to the handlebar/support means which allows a rotational movement of the arm around the handlebar or an axis substantially parallel to the axis of the handlebar (the pivot axis is oriented in the sideway direction). In order to allow a sideway movement of the footboard assemblies with respect to the steering column, each arm may be mounted via a bearing to the handlebar which allows a rotational movement of the arm around an axis which is substantially perpendicular to the axis of the handlebar and directed into the direction of motion (the pivot axis is oriented in the forward-backward direction). Due to the fixed length of the connection arms, however, the steering column together with the handlebar will incline sideways during sideway movement of the footboard assemblies and/or the steering column will incline forward-backward during a forward-backward movement of the footboard assemblies, which is quite unpleasant for the user.

In order to avoid that the steering column and/or the support means (handlebar) move(s) or incline(s) extensively during use, it is preferred that the footboard assemblies are connected to the support means such that the distance (the directed distance along a straight line from in a 3-dimensional Euclidean vector space) between each footboard assembly and the support means is variable during the skating movement. Such a variable connection may be achieved by different constructions. For instance the distance "d" (see dotted double arrow in FIG. 7) between the support means and the footboard assembly is variable during the skating movement, e.g., when the footboard assembly moves back and forth (see double arrow "a" in FIG. 7.).

Figure 2:
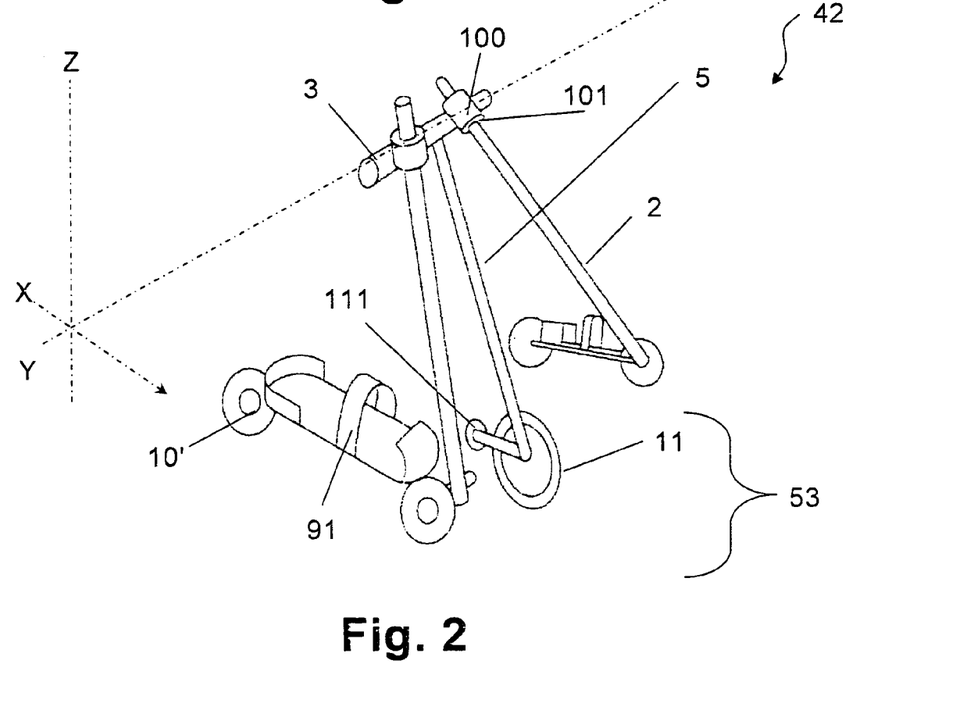
FIG. 2 shows a perspective elevation of a skating device according to a first embodiment of the present invention.

For instance, the arm assemblies for connecting the footboard assemblies and the support means may comprise a fixed length, but the arm assemblies are slidably mounted at the support means (see e.g., FIG. 2). A variable distance between each footboard assembly and the support means may be also achieved by an arm assembly which comprises at least two arm portions, e.g. an upper arm and a lower arm, which are connected via a hinge. Such a hinged arm assembly is constructed like a "spider leg". The "arm length" of such an arm assembly construction is substantially constant; even during motion. However, due to the hinge between the upper and lower arm, the distance between the footboard assembly and the support means is variable.

In other words, it is preferred that each arm assembly comprises an upper arm mounted to the support means and a lower arm mounted to the footboard assembly, wherein the upper arm and lower arm are connected by a hinge. The hinge preferably allows that the lower arm may rotate with respect to the upper arm. The rotational movement is preferably a rotation in one degree of freedom wherein the axis for the rotation is substantially parallel to the ground, preferably even during the skating movement.

According to a further preferred embodiment, the "arm length" of the arm assembly (arm) may be variable, e.g., the arm may be a telescopic arm. A telescopic arm may be constructed as a parallelogram arm, lazy tong or a telescopic arm with concentric aligned arm elements, which are at least partly slidable to each other. The cross section of the telescopic arm elements may be rectangular, squared or circular (round).

Thus, by moving the footboard assemblies in a skating manner, the user gets under way, while at the same time he/she is able to stand substantially upright and to steer in the direction of travel with the steering column.

Moreover, in order to allow further acceleration during skating movement, it is preferred that the footboard assemblies are also allowed to be moved in a further degree of freedom. For instance, it is advantageous when each footboard assembly is mounted to the support means in such a way that also "yawing" is allowed. In other words, it is beneficial when during the simultaneous lateral (sideward) and forward and rearward motion the footboard assembly may be rotated left and/or right (yawing), e.g., around an axis directed parallel to the gravitational force.

Furthermore, e.g. in order to further enhance the traveling comfort (e.g. traveling over bumpy underground) it is further preferred when each footboard assembly is further allowed to move up and down (heaving) with respect to the support means and/or to rotate forward and backward (pitching). In particular, it is preferred that each footboard assembly is mounted to the corresponding arm assembly in such a way that the footboard assembly may rotate around the mounting point (axis) between the footboard assembly and the arm assembly. In other words, it is preferred when each footboard assembly is allowed to rotate the back portion of each footboard assembly up/down with respect to the front portion of the footboard assembly. Still in other words, it is preferred that the heel which is fixed to the footboard assembly may be rotated up/down with respect to the toes together with the footboard assembly. This rotational movement further enhances that the sole of the user is substantially parallel to the ground, e.g., the front wheel and the back wheel of a footboard assembly are in contact with the ground while the footboard assembly is moved forward/backward with respect to the support means.

Finally it may be further beneficial if each footboard assembly is additionally or alternatively allowed to rotate or tilt from side to side (rolling). However, according to a preferred embodiment, it is preferred that such a tilt movement is restricted to a predetermined small angular range, preferably smaller than 20°, more preferably smaller than 10°, since a larger tilting movement may result in "knock-knees". In other words, in order to avoid such knock-knees, it is preferable when the sole of the user's foot is supported by the footboard assemblies to be substantially parallel to the around during the skating movement (see, e.g., FIG. 6).

In short, according to the present invention each footboard assembly is mounted to the support means in such a way that at least a motion in two degrees of freedom, preferably three, four, five or six degrees of freedom with respect to the support means are allowed.

According to a general aspect of the present invention, a skating device according to the present invention comprises at least two footboard assemblies to support the user's feet. The footboard assemblies provide ground contact via rollers or skids. Each of the two footboard assemblies is mounted via an arm assembly to a (common) support means, which is preferably located above the footboard assemblies during use of the device. Each arm assembly may comprise at least one rod. Each arm assembly is preferably mounted at a proximal portion or a proximal end of the arm assembly to the support means, whereas the arm assembly is preferably mounted at a distal portion or a distal end of the arm assembly to the footboard assembly. For instance the arm assembly may be mounted directly to the footboard of the footboard assembly or may be mounted to the skid or an axis of one of the rollers of the footboard assembly.

According to a preferred embodiment of the invention, each arm assembly is preferably mounted to the support means such that each arm assembly is allowed to move at least in two degrees of freedom with respect to the support means such that a skating movement of the two footboard assemblies with respect to the support means is possible. The support means is preferably located below a handlebar, which is preferably substantially perpendicular to the direction of motion (direction of motion of the device) and preferably substantially parallel to the ground surface.

For instance, each arm assembly may be mounted to the support means such that a rotational movement around an axis, which is parallel to the handlebar, is possible. Moreover, it is preferred that a rotational movement of the arm assembly around an axis parallel to the direction of motion is possible. It is also preferred that the distance between the footboard assembly and the support means may be varied during skating movement. For instance, an arm assembly or a rod that is variable in length, e.g., a telescope rod, may achieve such a variation of distance. According to another embodiment of the invention, the variation of the distance between the footboard assembly and the support means may be achieved by providing a mounting bracket at the support means, which allows that the rod may slide relative to the handlebar. According to still another embodiment, an arm assembly may comprise at least two arm portions, e.g. an upper and a lower arm portion which are connected via a hinge.

The distal ends of the arm assemblies (rods) may be directly mounted to the support means by means of bearings or joints. Each bearing or joint preferably allows pivoting around a Y-axis substantially parallel to the support means (handlebar) and/or pivoting around an X-axis perpendicular to the Y-axis, wherein the X-axis is substantially parallel to the direction of motion.

According to a further preferred embodiment, the arm assembly for mounting the footboard assembly to the support means is an arm assembly with at least one rod which is variable in length, e.g., a (cylindrical) telescopic rod which comprises two concentric rods. According to a further aspect, an arm assembly which is variable in length may also be provided by two flat bars, or telescopic rods with a rectangular cross section. The cylindrical telescopic rod, however, provides the additional advantage that each footboard assembly may be rotatable around a longitudinal axis defined by the telescopic rod.

In order to provide a stable skating device, it is preferred that the handlebar is additionally supported by an additional support unit, which supports the handlebar against the ground. In particular, the handlebar is preferably supported by at least a further support column (assembly). Said support column comprises a distal end and a proximal end, wherein said proximal end is mounted, preferably fixedly mounted, to the handlebar, whereas said distal end being preferably mounted to a wheel/skid carriage with at least one wheel/skid for ground contact. For instance, the support column may be an upright steering column which comprises a suitable handlebar at its upper end and a (front) steering wheel pivoted in a bifurcated lower end. The steering column may be comprised of one single column or a plurality of columns, e.g. two substantially parallel upright columns. According to a further preferred embodiment, there may be two or more steering wheels mounted at the lower end of the steering column. Said wheels may comprise substantially the same diameter or different diameters.

According to another embodiment of the present invention, the "handlebar" is part of a pushchair, buggy or wheel chair. In this embodiment, the upright steering column is replaced by a more complex construction, i.e., the support column is part of the pushchair, buggy or wheel chair. Nevertheless, the principles of the skating device remain substantially unchanged, i.e., the mounting with respect to the handlebar is important and not the particular design of the additional support column and the wheel carriage which may be constructed in form of a simple steering column or in form of a more complex pushchair, buggy or wheel chair.

In order to provide a smooth and stable skating motion of the skating device it is preferred that each footboard assembly comprises at least a footboard to support the user's foot and at least two rolls, preferably mounted at the front and rear portions of the footboard. According to further embodiments, it is also possible to provide the footboard assemblies with a plurality of rolls, e.g., three rolls in line, four rolls in line or even more rolls, preferably mounted along the length of the footboard assembly (e.g., in line).

According to a further aspect, there is provided a brake for braking the skating device. For instance, in a preferred embodiment of the present invention, at least one brake is mounted at a footboard assembly for braking at least one roll, wherein the brake is preferably operable by means of a brake handle mounted at the handlebar. According to a preferred embodiment, the skating device has a separate brake for each front or rear wheel, with each brake being independently actuated by separate levers by the vehicle user (operator). Alternatively or additionally a brake may be provided at the wheel(s) which are mounted at the steering column. Moreover, instead of braking at least one of the wheels is may be further preferred to provide stopper means at one or both footboard assemblies which allows a user to reduce his travelling speed. Such stopper means may be constructed similar like conventional stopper means of inline skates or roller skates, e.g., elastic elements (e.g. rubber) which are mounted at the front and/or back portion of one or both footboard assemblies.

According to a further preferred embodiment, the skating device comprises linkages at the arm assemblies and/or at the steering column such that the device is collapsible/foldable for storage and/or transportation.

According to a further preferred embodiment, the arm assemblies of the skating device may be detachably fixed to the steering column such that the orientation of the two footboard assemblies to each other is fixed. Such a detachably fixing is advantageous for rolling the skating device next to the user, when the device is not actively used. For instance, the arm assemblies may be detachably fixed to the steering column by a clip mechanism such that the two footboard assemblies and the front wheel form a tripod.

Still according to a further preferred embodiment a shopping basket may be attached to the steering column and/or the handlebar. Hence, if the footboard assemblies are detachably fixed to the steering column, the skating device with the shopping basket may be used as shopping cart or shopping trolley.

While the present skating device is primarily supported by wheels or rolls, it will be seen that the principle of operation need not be limited to rollers or wheels, but may be applied to skis, skates, and other sliding contact devices as well, with such sliding contact devices being adaptable to the present invention.

BRIEF DESCRIPTION OF THE DRAWINGS

The invention will now be described in detail with respect to preferred embodiments with reference to accompanying drawings, wherein.

DETAILED DESCRIPTION OF THE INVENTION

In the following, the device of the present invention and the method for operating the device will be described.

The skating device of the present invention is illustrated throughout the drawings as a wheeled vehicle, although it will be seen that the skating device may be equipped with virtually any conventional type of either rolling or sliding surface contact means (e.g., in-line or other wheeled skates, ice skates, skis, etc.). The natural skating movement is not limited to rolling means (e.g. wheels, rollers, skates, etc.), but may be applied to any low friction surface contact means allowing the skating device to travel over a surface with minimal friction losses.

Figure 1:
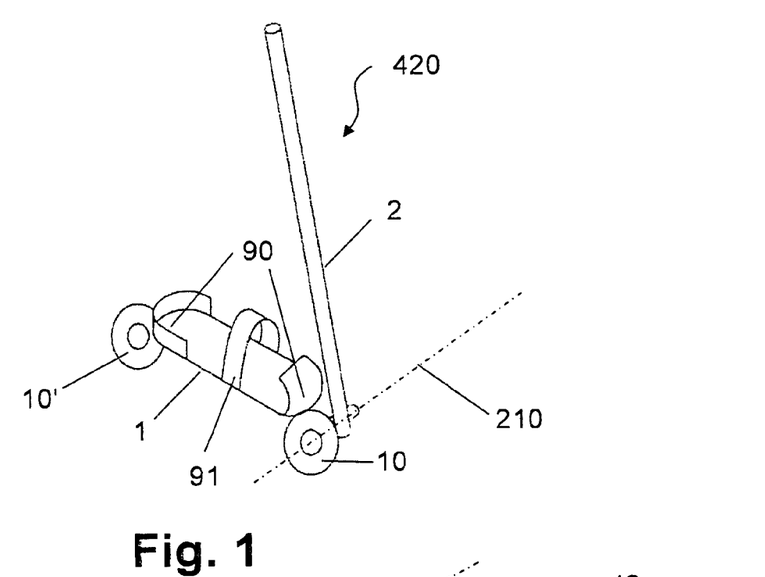
FIG. 1 shows a perspective elevation of a single footboard assembly with a rod.

The wheeled embodiment of FIG. 1 shows a sideframe 420 according to the present invention which comprises a footboard assembly 1 with an arm 2. The footboard assembly 1 comprises a board for supporting a user's foot with two rolls 10, 10' mounted at the front and rear end of the board, respectively. In order to firmly position the user's foot together with his/her worn shoe, a housing or chassis 90 may be provided. For instance, the heel and the front part of the foot may be positioned and/or held by chasis 90. The binding 91, e.g., a wrap around binding with at least one strap holds the user's foot firmly in position during skating movement. Dual lock fasteners such as Velcro® fasteners further allow an easy adjustment of the binding. The arm 2 in form of a rod 2 is mounted to the footboard assembly 1. As can be seen from FIG. 1, the rod 2 is mounted to the axle of the front roll 10. This provides the advantage that the footboard assembly is allowed to rotate around the axis 210, which is (substantially) parallel with the axle of the front roll 10. Using the nautical terminology as defined above, the rotational movement around the axis 210 allows "pitching", which enhances the traveling comfort over bumpy underground.

FIG. 2 shows a first embodiment of a skating device according to the present invention. The skating device 42 comprises a front steering wheel 11 pivoted in a bifurcated lower end of an upright support column 5 having a handlebar 3 at its upper end. In other words, a support column 5 is provided in form of the steering column 5, wherein the handlebar 3 is mounted to the proximal end of the steering column 5 and a wheel carriage 53 with front wheel 11 and back wheel 111 is provided at the distal portion or end of the steering column 5. The front wheel 11 and/or the back wheel 111 may be further used as driving wheels, e.g., a motor which drives the front wheel 11 and/or the back wheel 111 may be mounted to the wheel carriage. Preferably, the motor is an electric motor which may be switched on and/or off by the user.

Figure 3:
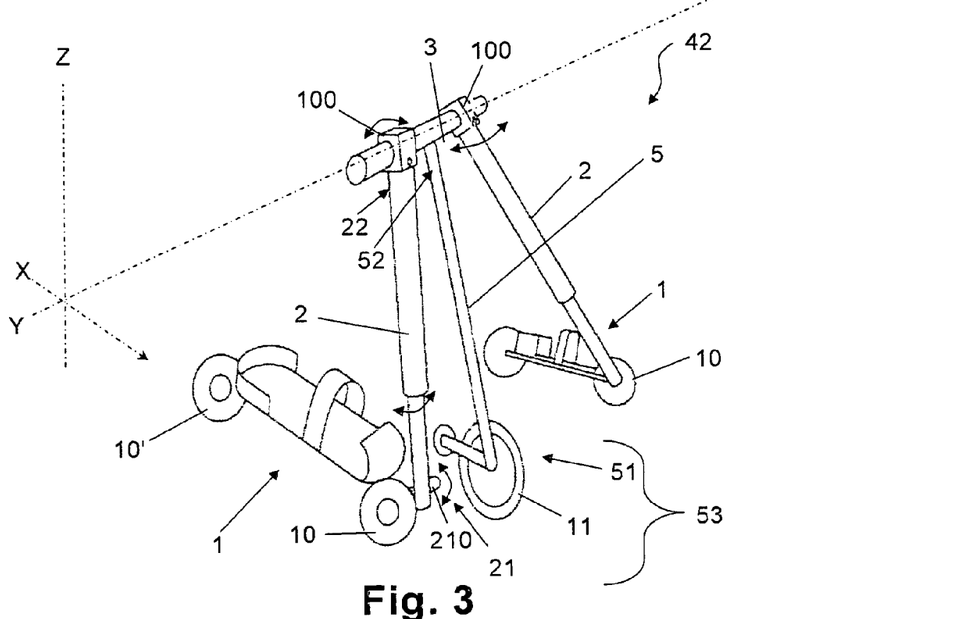
FIG. 3 shows a perspective elevation of a skating device according to a second embodiment of the present invention.

The steering column 5 is preferably adjustable in length for different body heights of the users. The adjustment of the length of the steering column may be also used for adjusting the inclination of the steering column with respect to the upright position (Z-axis). For instance the column 5 may be formed as a telescopic rod, wherein a quick clamp detachably fixes the rod elements to each other. The wheel carriage 53 as shown in FIGS. 2 and 3 comprises in addition to the wheel 11, a further smaller steering wheel 111, which is mounted behind the front steering wheel 11. Such a construction allows a self-supporting skating device. Two footboard assemblies 10 with rods 2, similar to those shown in FIG. 1, are mounted to the handlebar 3 via bearing assemblies 100. Each bearing assembly 100 allows the rod 2 to pivot substantially around the Y-axis, defined by the longitudinal axis of the handlebar 3. Moreover, each bearing assembly 100 further allows a rotational movement around the X-axis (or an axis substantially parallel to the X-axis), which is perpendicular to the Y-axis and points substantially in the direction of motion of the skating device. Thus, the bearing assembly 100 allows a movement of the rods together with the footboard assembly in two degrees of freedom. Moreover, each rod 2, which comprises a fixed length in this particular embodiment, is slidably mounted to the bearing assembly 100, i.e., the distance between the footboard assembly 10 and the handlebar 3 is variable or changeable during skating movement. Accordingly, a user may move the footboard assemblies sideways with regard to the steering column 5 and back and forth with regard to the steering column 5 which allows a basic skating movement.

Figure 5:
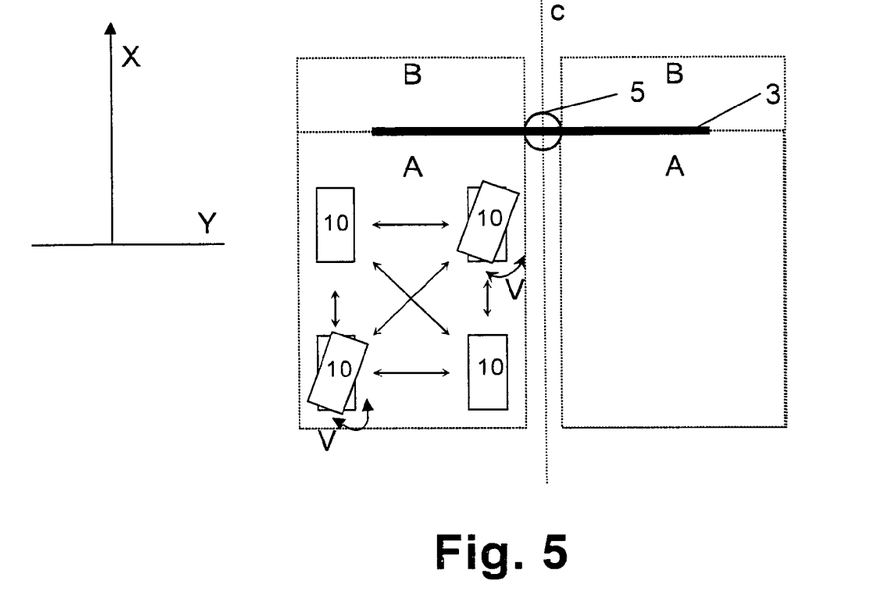
FIG. 5 illustrates in a top view areas of motion of footboard assemblies with respect to a handlebar.

In other words, in order to allow a skating motion it is preferred that each of the two footboard assemblies 10 may move in a forward/rearward direction (longitudinal movement; parallel to the X-axis) and simultaneously in an outward/inward direction (lateral movement; parallel to the Y-axis) with respect to the handlebar 3. The preferred allowed range of motion for each footboard assembly 10 is further schematically explained in FIG. 5. FIG. 5 shows in a top view the handlebar 3 and the steering column 5, which is substantially oriented in the direction of the Z-axis. The X-axis shows in the direction of motion of the skating device.

In order to allow a skating motion it is preferred that each footboard assembly is preferably continuously movable in a longitudinal and a lateral direction within an area "A", which is preferably located beside and behind the handlebar 3. Thus, the left footboard 10 is movable within the left area A and the right footboard assembly 10 is movable within the right area A. According to a further preferred embodiment, it is additionally preferred that each footboard assembly 10 is preferably continuously movable in a longitudinal and lateral direction within an area "B", which is preferably located beside and before (ahead) the handlebar. Thus, each footboard assembly is preferably continuously and individually movable within an area "A+B". In other words, in order to allow a smooth skating movement it is preferred that each footboard assembly 10 is allowed to move within the area A or A+B such that each point within these areas is reachable with the footboard assembly. The areas are schematically illustrated as rectangles, however, the outline (perimeter) of the areas A and B are not limited to a particular shape, since the outline of the areas A and B is typically dependent on the mechanism how the footboard assemblies are mounted to the handlebar. It is, however, preferred that the area A and/or B is at least $0.16\,m^2$, preferably at least $0.3\,m^2$, more preferably at least $0.4\,m^2$ or even more.

Furthermore it is preferred that the area A and/or A+B of the left foot and the area A and/or A+B of the right foot overlap partly. In other words it may be preferred that the left foot is allowed to move beyond the centerline c partly within the area A and/or A+B of the right foot and vice versa.

Furthermore, each rod 2 comprises a round cross-section and the bearing assembly 100 further allows that the rod may pivot within the bushing 101. Accordingly, a motion in a further degree of freedom is allowed, namely the user is allowed to rotate his/her foot around the rod 2 which is more comfortable for the user.

Referring to FIG. 3, the skating device according to a second embodiment is shown. Like the skating device of FIG. 2, it comprises a front wheel 11 pivoted in the bifurcated lower end 51 of a substantially upright steering column 5 having a suitable steering handlebar 3 at its upper end. The handlebar 3 provides pivotal connections for a pair of sideframes 420 (FIG. 1 shows a single sideframe), each having an individual footboard assembly 1 with an arm assembly 2. The arm assembly 2 is pivotally connected to the handlebar 3 via the bearing or joint 100. The bearing 100 allows that the arm assemblies 2 pivot around the Y-axis which is defined by the handlebar 3. In particular, the Y-axis is substantially parallel with the handlebar 3. Moreover, each arm assembly 2 is provided in form of a telescopic rod, which allows that the distance between the footboard assembly 1 (or the mounting point between the footboard assembly 1 with the arm assembly 2) and the handlebar 3 may be varied. Therefore, a forward-backward movement of the footboard assembly 1 with regard to the steering column is provided.

Moreover, the bearing 100 also allows that the arm assemblies 2 pivot around the X-axis which is substantially parallel to the direction of motion. Therefore, a lateral movement of each footboard assembly 1 with regard to the steering column is provided.

In preferred embodiments of the present invention, at least one of the wheels 10, 10' or 100 is provided with a braking assembly or brake (not shown) which is operatively connected to the handlebar 3 through a grip mechanism (not shown). For instance, a brake may be provided at the steering wheel 100 and/or provided at one of the rolls/wheels 10, 10' of the footboard assembly. The braking assembly may be obtained from commercially available components, e.g. the brake assembly may comprise bicycle wheel type caliper operated frictional braking pads, which contact the rims of the roll/wheel. For instance, two pivoting calipers may be pivotally mounted on the rear and/or front side of the footboard assembly.

Figure 7:
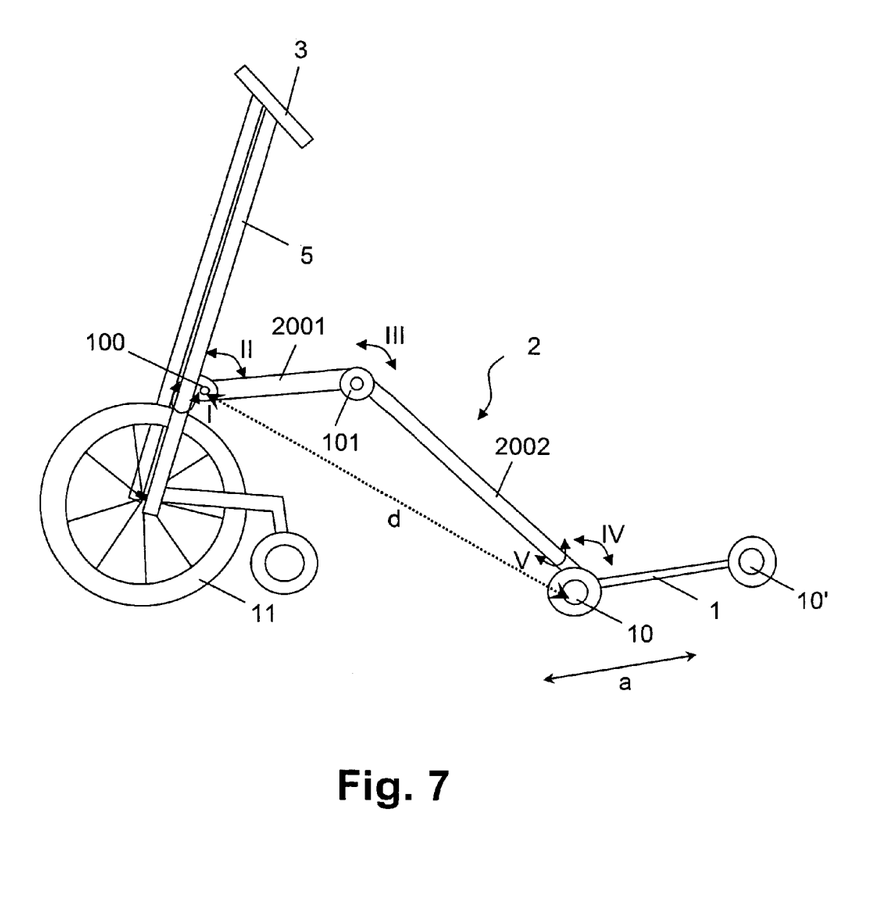
FIG. 7 shows a further embodiment of a skating device according to the present invention.

The skating device 42 may be equipped with a shopping basket, e.g., mounted at the handlebar or the steering column 5. Moreover, the steering column 5 may comprise a plurality of columns as shown in FIG. 7 which further supports the shopping basket and may provide further stability.

The operator of the present skating device operates the skating device by standing atop the left and right footboard assemblies 1, respectively, and gripping the handlebar 3. The operator then moves the two footboard assemblies 1 individually but alternatingly forward/rearward and sideways, i.e., in the natural skating movement. The skating device of the present invention supports the operator such that the center of gravity of the operator is substantially maintained in the same position with respect to the steering columns, i.e., the operator is able to move in a substantially upright position.

Figure 4:
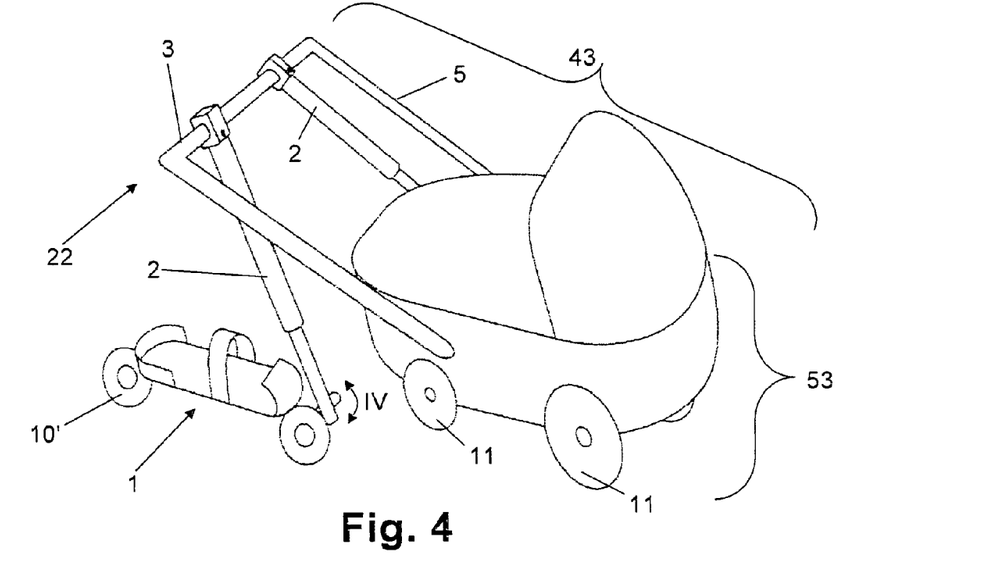
FIG. 4 shows a perspective elevation of a skating device mounted on a baby buggy in accordance with a third embodiment of the present invention.

Referring to FIG. 4, a skating device according to a third embodiment is shown. Like the skating device of FIG. 3, it comprises two sideframes 420 with telescopic rods 2. The rods 2 are mounted to a support means 3, which is a handlebar of a pushchair 43. Like in the embodiment of FIG. 3, the handlebar 3 provides pivotal connections for the pair of sideframes 420, each having an individual footboard assembly 1 with a rod 2. The rod 2 is pivotally connected to the handlebar 3 via the bearing 100. The bearing or joint 100 allows that the rod pivots around the Y-axis which is defined by the handlebar 3. In particular, the Y-axis is substantially parallel with the handlebar 3. Moreover, each rod 2 is provided in form of a telescopic rod, which allows that the distance between the footboard assembly (or the mounting point of the footboard assembly with the rod 2) and the handlebar may be varied during movement. Therefore, a forward-backward movement of the footboard assembly 1 with regard to the steering column is provided. Moreover, the bearing 100 also allows that the rod 2 pivots around the X-axis which is substantially parallel to the direction of motion. Therefore, a lateral movement of the footboard assembly 1 with regard to the steering column is provided.

Thus, similar to the embodiment of FIG. 3, the support means, i.e., the handlebar, is supported by at least one support column 5. In particular, the pushchair 43 comprises two support columns 5 for supporting the handlebar 3 at the proximal end 52 of the support columns. Also, similar to the embodiment of FIG. 3, a wheel carriage 53 is mounted to the distal portion or distal end 51 of the support column 5. In other words, the wheel carriage 53 is part of the pushchair 43 which comprises at least one roll/wheel for around contact.

Figure 6:
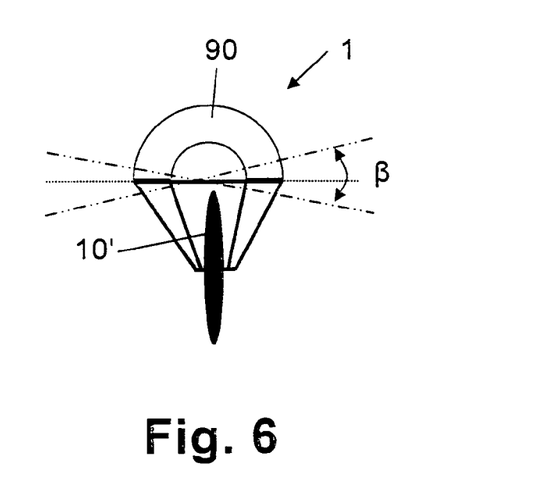
FIG. 6 shows a footboard assembly from the rear side with a wheel below the footboard.

FIG. 6 shows a footboard assembly 1 from the rear side with a wheel 10' below the footboard and the chassis 90 on top of the footboard. In order to avoid knock-knees, it is preferable when the sole of the user's foot is supported by the footboard assemblies to be substantially parallel to the ground during the skating movement. However, it may be further beneficial if each footboard assembly is additionally or alternatively allowed to rotate or tilt from side to side by the angle β (rolling). The angle β is preferably a predetermined small angle, smaller than 60°, more preferably smaller than 40°, smaller than 20° or even smaller than 10°.

FIG. 7 shows a skating device according to a further embodiment of the present invention. The device comprises—like the device of FIG. 3—a front steering wheel 11 pivoted in a bifurcated lower end of a substantially upright steering column 5. The depicted steering column 5 with two parallel rods is not restricted to this particular embodiment, i.e., the above-discussed embodiments may also comprise a steering column 5 with two parallel rods. The handlebar 3 is mounted at the upper end of the rods of the steering column 5. Only the left footboard assembly 10, which is mounted to the left (seen in moving direction) rod of the steering column 5, is shown. A right footboard assembly (not shown) is mounted accordingly to the right rod of the steering column 5.

In contrast to the embodiment with the telescopic rod 2, which allows that the distance between the footboard assembly and the steering column 5 or the handlebar 3 is variable during the skating movement, an arm assembly 2 with two arms 2001 and 2002 is shown. The upper arm 2001 is mounted via a hinge 100 to the steering column 5. The hinge 100 preferably allows a pivotal or partly pivotal movement of the arm 2001 around the left rod of the column 5 (indicated by the double arrow I) and preferably a pivotal upward and downward movement (indicated by the double arrow II). The upper arm 2001 is mounted via a further hinge 101 to the lower arm 2002, e.g., the lower arm 2002 is allowed to rotate in a degree of freedom with respect to the upper arm 2001 (indicated by the double arrow III).

Finally, the lower arm 2002 is mounted to the footboard assembly 1 via a further hinge, which allows at least a further pivotal movement of the footboard assembly with regard to the lower arm 2002. For instance, the footboard assembly 1 is allowed to rotate upwardly and downwardly which is indicated by the double arrow IV (see also FIG. 4). In other words, it is preferred when each footboard assembly 1 is allowed to rotate the back portion of each footboard assembly up/down with respect to the front portion of the footboard assembly 1. Preferably, this rotational movement is independent from the other degrees of freedom. Still in other words, it is preferred that the heel, which is fixed to the footboard assembly 1 may be rotated up/down with respect to the toes together with the footboard assembly. This rotational movement IV further enhances that the sole of the user is substantially parallel to the ground, e.g., the front wheel 10 and the back wheel 10' of a footboard assembly 1 are in contact with the ground while the footboard assembly 1 is moved forward/backward with respect to the support means (see double arrow "a").

Moreover, the footboard assembly is allowed to rotate sideways with respect to the lower arm 2002 (indicated by the double arrow V; see also FIG. 5). This additional degree of freedom further supports the skating movement. In other words, it is preferred that the back portion of each footboard assembly 1 may be rotated laterally with respect to the front portion of the footboard assembly. Preferably, this rotational movement is independent from the other degrees of freedom. Still in other words, it is preferred that the heel of a user's foot, which is fixed to the footboard assembly 1, may be rotated laterally with respect to the toes together with the footboard assembly. This rotational movement V further enhances that the user may move his feet in a natural skating movement.

In other words, the arm assembly is constructed like a spider leg. Again, this construction of a hinged arm assembly 2 allows a movement of the footboard assembly as defined in FIG. 5 and discussed above.

In summary, the present invention provides a much-needed improvement in efficiency of construction for a skating device, with its operation providing excellent exercise, as well as transportation, for the operator.

The invention has been illustrated and described in detail in the drawings and foregoing description. Such illustration and description are to be considered in an illustrative or exemplary and non-restrictive manner, i.e., the invention is not limited to the disclosed embodiments. Moreover, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be considered as limiting the scope.

The invention claimed is:

1. A skating device comprising:
   two footboard assemblies with ground contact rollers or skids,
   two arm assemblies, each arm assembly comprising: an upper arm and a lower arm,
   the upper arms mounted to a steering column at a location above the footboard assemblies and the lower arms mounted to the footboard assemblies, respectively,
   wherein
   each footboard assembly is allowed to move at least in two degrees of freedom with respect to the steering column,
   the upper arm is mounted via a first hinge to the steering column such that a lateral movement of each footboard assembly with respect to the steering column is possible,
   characterized in that
   the upper arm and the lower arm are connected by a second hinge which allows a rotation around an axis which is substantially parallel to the ground during skating movement, and
   wherein said first hinge and said second hinge allow a forward/backward movement of each footboard assembly during the skating movement.

2. The device according to claim 1, wherein a distance between the footboard assemblies and the steering column is variable during the skating movement.

3. The device according to claim 1, wherein a length of each arm assembly is substantially constant during skating movement.

4. The device according to claim 1, wherein said steering column comprises at least a distal end and a proximal end,
   wherein said proximal end is mounted to a handlebar and
   said distal end being mounted to a wheel carriage with at least one roller for ground contact.

5. The device according to claim 4, wherein at least one brake is mounted to the footboard assembly for braking at least one roller, wherein the brake is operable by means of a brake handle mounted to the handlebar.

6. The device according to claim 1, wherein each footboard assembly comprises at least two rollers.

7. The device according to claim 6, wherein the rollers are mounted along the length of the footboard assembly.

8. The device according to claim 1, wherein each footboard assembly is further movable in a third degree and fourth degree of freedom.

9. The device according to claim 1, wherein each footboard assembly is further movable in an additional fifth degree of with respect to the support means.

10. The device according to claim 1, wherein each arm assembly is mounted at its distal end to a rotational shaft of a ground contact roller such that rotational movement of the footboard assembly around said shaft is allowed.

11. The device according to claim 1, wherein each footboard assembly is allowed to move within a first area which is located adjacent and behind the support means, and optionally within a second area which is located beside and ahead the handlebar, wherein said first area is at least 0.4 m².

12. A skating device comprising:
- two footboard assemblies with ground contact rollers or skids,
- two arm assemblies comprises at least a distal end and a proximal end, wherein the distal ends of the arm assemblies are mounted to the footboard assemblies, respectively, and
- the proximal ends of the arm assemblies are mounted to a common support means located above the footboard assemblies, wherein each footboard assembly is allowed to move at least in two degrees of freedom with respect to the support means
- each arm assembly comprises a telescope rod characterized in that
- each telescope rod comprises a cylindrical diameter such that a rotational movement around the axis of the rod is possible and a simultaneously lateral and forward/backward movement of the two footboard assemblies with respect to the support means is possible.

13. The device according to claim 12, wherein the support means is a handlebar, wherein said handlebar is further supported by at least a further steering column.

14. The device according to claim 12, wherein the distal ends of the arm assemblies are directly mountable to the support means by means of bearing assemblies,
- wherein each bearing assembly allows pivoting around a first axis, X substantially parallel to the direction of motion and pivoting around a second axis, Y which is perpendicular to the first axis, X and perpendicular to a third axis, Z, which is oriented parallel to the gravitational force.

15. The device according to claim 12, wherein a distance between the footboard assemblies and the support means is variable during the skating movement.

* * * * *

UNITED STATES PATENT AND TRADEMARK OFFICE
CERTIFICATE OF CORRECTION

PATENT NO. : 8,505,937 B2  Page 1 of 1
APPLICATION NO. : 12/991029
DATED : August 13, 2013
INVENTOR(S) : Andreas Epstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this

Fifteenth Day of September, 2015

Michelle K. Lee
*Director of the United States Patent and Trademark Office*